United States Patent
Uchida et al.

(10) Patent No.: US 10,633,518 B2
(45) Date of Patent: Apr. 28, 2020

(54) SURFACE TREATMENT AGENT FOR METAL MATERIAL, METHOD OF PRODUCING THE SAME, METAL MATERIAL HAVING A SURFACE TREATMENT COATING, AND METHOD OF PRODUCING THE SAME

(71) Applicant: Nihon Parkerizing Co., Ltd., Tokyo (JP)

(72) Inventors: Junichi Uchida, Tokyo (JP); Ichiro Oura, Tokyo (JP)

(73) Assignee: NIHON PARKERIZING CO., LTD., Tokyo (JP)

(*) Notice: Subject to any disclaimer, the term of this patent is extended or adjusted under 35 U.S.C. 154(b) by 44 days.

(21) Appl. No.: 15/716,737

(22) Filed: Sep. 27, 2017

(65) Prior Publication Data
US 2018/0086898 A1  Mar. 29, 2018

(30) Foreign Application Priority Data

Sep. 27, 2016  (JP) ................................. 2016-188515

(51) Int. Cl.
| | | |
|---|---|---|
| *C08K 5/5419* | (2006.01) | |
| *C23C 22/62* | (2006.01) | |
| *C09D 1/02* | (2006.01) | |
| *C09D 5/08* | (2006.01) | |
| *C23C 22/05* | (2006.01) | |
| *C08K 3/36* | (2006.01) | |

(52) U.S. Cl.
CPC .............. *C08K 5/5419* (2013.01); *C09D 1/02* (2013.01); *C09D 5/08* (2013.01); *C23C 22/05* (2013.01); *C23C 22/62* (2013.01); *C08K 3/36* (2013.01); *C23C 2222/20* (2013.01)

(58) Field of Classification Search
CPC .... C08K 3/36; C08K 5/5419; C23C 2222/20; C23C 22/05; C23C 8/00; C23C 22/62
See application file for complete search history.

(56) References Cited

U.S. PATENT DOCUMENTS 6,793,728 B1 * 9/2004 Davies ..................... C09D 1/02
106/287.1

FOREIGN PATENT DOCUMENTS

| JP | 2003-145034 A | 5/2003 |
| JP | 2005-298765 A | 10/2005 |
| JP | 2006-213958 A | 8/2006 |
| WO | 2010/070728 A1 | 6/2010 |

OTHER PUBLICATIONS

Jacobsen et al, "Enantioselective Catalytic Ring Opening of Epoxides with Carboxylic Acids", Tetrahedron Letters, vol. 38, No. 5, pp. 773-776, 1997.*
Office Action issued in Japanese Application No. 2016-188515, dated Mar. 3, 2020 (8 pages).

* cited by examiner

*Primary Examiner* — Frances Tischler
(74) *Attorney, Agent, or Firm* — Osha Liang LLP

(57) ABSTRACT

A surface treatment agent for metal material may include a compound (A) that is obtained by modifying a silicic acid (a) with a hydrolysate (b) of an epoxy group-having silane coupling agent, a silicic acid (B) represented by $M_2O \cdot SiO_2$ (wherein a mass ratio of $M_2O$ to $SiO_2$ is 0.1 to 1 and M represents an alkali metal), and water. A mass ratio (B/A) of the silicic acid (B) to the compound (A) is 1.1 to 17.9.

20 Claims, No Drawings

SURFACE TREATMENT AGENT FOR METAL MATERIAL, METHOD OF PRODUCING THE SAME, METAL MATERIAL HAVING A SURFACE TREATMENT COATING, AND METHOD OF PRODUCING THE SAME

TECHNICAL FIELD

The present invention relates to a surface treatment agent for metal material which is appropriate for a metal material to be used for electronic components and micro device components incorporated into industrial products, such as automobiles, home electronics or office automation appliances; a method of producing the same; a metal material having a surface treatment coating, the coating obtained by treating the surface of the metal material using the surface treatment agent for metal material; and a method of producing the same.

BACKGROUND ART

In industrial products, such as automobiles, home electronics or office automation appliances, metal materials are used for electronic components and micro device components forming those products. These industrial products are used under various environments such as indoor and outdoor, above the ocean, and in factory.

Thus, these metal materials used for industrial products need to endure severe environments including these environments.

Recently, there has been a demand to increase the functionality and density of electronic components and micro device components, and the miniaturization and refinement of these components have proceeded. Accordingly, for the purpose of aiming at protecting the metal materials used for electronic components and micro device components, there has been developed a technique of forming a surface treatment coating on the surface of the metal materials.

For example, there is an embodiment in which an organic surface treatment coating is formed on the metal material surface. Specifically, there is an embodiment in which a surface treatment coating containing an organic constituent as a main ingredient is included, or there is an embodiment in which an organic protective coating made of a sealant is formed. More specifically, there is a method of self-depositing a water-dispersible organic polymer resin on the metal material surface to form a surface treatment coating (Patent Literature 1). Further, there is disclosed a method of forming an organic protective coating made of a sealant containing a specific acrylic resin and inorganic filler (Patent Literature 2).

Further, there is also an embodiment in which an inorganic surface treatment coating is formed on the metal material surface. Specifically, it is disclosed a method of forming an inorganic surface treatment coating on the metal material surface using a surface treatment agent which contains a phosphoric acid-based compound, a fluoro acid containing a predetermined element such as titanium or zirconium, and a silane coupling agent (Patent Literature 3).

CITATION LIST

Patent Literature
  Patent Literature 1: JP 2003-145034 A
  Patent Literature 2: JP 2005-298765 A
  Patent Literature 3: JP 2006-213958 A

SUMMARY OF INVENTION

Technical Problem

Recently, metal materials have been used in severer environments in many cases. Thus, there is an increasing demand for the performance of the surface treatment coating (heat resistance, adhesion, and water resistance).

Particularly, any metal material used for electronic components and micro device components is exposed to high temperatures during the production of the components or used in high-temperature environments after being incorporated in the vicinity of an automobile engine and in an electronic device. Therefore, the metal material needs to have excellent heat resistance in high-temperature environments and excellent adhesion and water resistance for a long period of time.

In the case of the organic surface treatment coatings described in Patent Literature 1 and Patent Literature 2, when the organic surface treatment coating is exposed to high temperatures, an organic substance forming the surface treatment coating decomposes, thereby exhibiting no predetermined performance.

Further, in the case of the inorganic surface treatment coating described in Patent Literature 3, most of the surface treatment coating does not decompose in high-temperature environments and remains. The environment to which the electronic components and the micro device components are exposed becomes a high-temperature environment at the time of using the components and becomes a room temperature environment at the time of non-using the components. Thus, the metal material repeats thermal expansion and thermal shrinkage. The inorganic surface treatment coating described in Patent Literature 3 easily causes cracks due to expansion and shrinkage, and the corrosion resistance and adhesion after being exposed to high-temperature environments are not sufficient.

Under the circumstances, an object of the present invention is to provide a surface treatment agent for metal material which can form a surface treatment coating having excellent heat resistance in high-temperature environments and excellent adhesion and water resistance for a long period of time on the metal material surface.

Further, another object of the present invention is to provide a metal material having a surface treatment coating, the coating being formed on the metal material surface by using the surface treatment agent for metal material.
Solution to Problem The present inventors have dedicated to repetitive studies to achieve the object. As a result, they have found that the use of a surface treatment agent containing a compound (A) obtained by modifying a silicic acid (a) with a hydrolysate (b) of an epoxy group-having silane coupling agent and a silicic acid (B) at a specific mass ratio can solve the problems, and completed the present invention. In other words, they have found that the object can be achieved by the following configurations:

(1) A surface treatment agent for metal material comprising: a compound (A) obtained by modifying a silicic acid (a) with a hydrolysate (b) of an epoxy group-having silane coupling agent; a silicic acid (B) represented by $M_2O \cdot SiO_2$ (wherein a mass ratio of $M_2O$ to $SiO_2$ is 0.1 to 1 and M represents an alkali metal.); and water, wherein a mass ratio (B/A) of the silicic acid (B) to the compound (A) is 1.1 to 17.9.

(2) The surface treatment agent for metal material according to (1), wherein the hydrolysate (b) of the epoxy group-having silane coupling agent is obtained by ring-opening the epoxy group-having silane coupling agent with a carboxylic acid, and the surface treatment agent for metal material contains the carboxylic acid.

(3) The surface treatment agent for metal material according to (1) or (2), wherein a mass ratio (a/b) of the silicic acid (a) to the hydrolysate (b) of the epoxy group-having silane coupling agent is 0.07 to 6.36.

(4) The surface treatment agent for metal material according to any one of (1) to (3), wherein the agent is for a metal material that is used for an electronic component and a micro device component.

(5) A method of producing a surface treatment agent for metal material, comprising:

adding a silicic acid (a), an epoxy group-having silane coupling agent, an acid catalyst (C) to water and mixing them to form an aqueous dispersion containing a compound (A) obtained by modifying the silicic acid (a) with a hydrolysate (b) of the epoxy group-having silane coupling agent; and adding the aqueous dispersion and a silicic acid (B) represented by $M_2O \cdot SiO_2$ (wherein a mass ratio of $M_2O$ to $SiO_2$ is 0.1 to 1 and M represents an alkali metal) to water and mixing them, wherein a mass ratio (B/A) of the silicic acid (B) to the compound (A) is 1.1 to 17.9.

(6) The method of producing a surface treatment agent for metal material according to (5), wherein the hydrolysate (b) of the epoxy group-having silane coupling agent is obtained by ring-opening the epoxy group-having silane coupling agent with a carboxylic acid, and the surface treatment agent for metal material contains the carboxylic acid.

(7) The method of producing a surface treatment agent for metal material according to (5) or (6), wherein the mass ratio (a/b) of the silicic acid (a) to the hydrolysate (b) of the epoxy group-having silane coupling agent is 0.07 to 6.36.

(8) The method of producing a surface treatment agent for metal material according to any one of (5) to (7), wherein the agent is for a metal material that is used for an electronic component and a micro device component.

(9) A metal material having a surface treatment coating, the coating obtained by bringing the surface treatment agent for metal material according to any one of (1) to (4) into contact with a metal material.

(10) A method of producing a metal material having a surface treatment coating comprising bringing the surface treatment agent for metal material according to any one of (1) to (4) into contact with a metal material.

Advantageous Effects of Invention

The present invention can provide a surface treatment agent for metal material which allows a surface treatment coating having excellent heat resistance in high-temperature environments and excellent adhesion and water resistance for a long period of time to be provided (formed) on the metal material surface.

Further, the present invention can provide a metal material having a surface treatment coating in which a surface treatment coating is provided (formed) on the metal material surface by using the surface treatment agent for metal material.

DESCRIPTION OF EMBODIMENTS

Hereinafter, the present invention will be explained according to the following items:
<<1. Surface Treatment Agent for Metal Material>>
<1-1. Ingredient>
{1-1-1. Compound (A)}
(1-1-1-1. Raw Material of Compound (A))
(1-1-1-2. Method of Producing Compound (A))
{1-1-2. A Silicic Acid (B)}
{1-1-3. Other Arbitrary Ingredients}
{1-1-4. Liquid Medium}
<1-2. blending Ratio>
(1-2-1.B/A)
(1-2-2.a/b)
<1-3. Liquid Characteristics>
<<2. Method of Using Surface Treatment Agent for Metal Material>>
<2-1. Target Base Material>
<2-2. Surface Treatment Method>
{2-2-1. Pretreating Step}
{2-2-2. Contacting Step}
{2-2-3. Drying Step}
{2-2-4. Arbitrary: Upper Layer Coating Forming Step}
<<3. Metal Material Having Surface Treatment Coating>>
<3-1. Surface Treatment Method>
<3-2. Upper Layer Coating>
<<1. Surface Treatment Agent for Metal Material>>

The surface treatment agent for metal material according to the present invention comprises a compound (A) obtained by modifying a silicic acid (a) with a hydrolysate (b) of "an epoxy group-having silane coupling agent" and a silicic acid (B) at a specific mass ratio. Hereinafter, the ingredients contained in the surface treatment agent for metal material according to the present invention will be described. The term "modified" means that the silicic acid (a) is bonded to the hydrolysate (b) of the epoxy group-having silane coupling agent (e.g., by a hydrogen bond).

<1-1. Ingredient>
{1-1-1. Compound (A)}

The surface treatment agent for metal material of the present invention contains the compound (A). The compound (A) is a compound obtained by modifying a silicic acid (a) with a hydrolysate (b) of an epoxy group-having silane coupling agent. It is assumed that the hydrolysate (b) of the epoxy group-having silane coupling agent adsorbs to the silicic acid (a) through a hydrogen bond between a silanol group (hydroxyl group) in the hydrolysate (b) of the epoxy group-having silane coupling agent and a silanol group (hydroxyl group) on the surface of the silicic acid (a) to form an intermediate. It is assumed that the surface treatment agent for metal material is then brought into contact with the metal material, followed by drying (heat-treating) the formed coating to thereby dehydrate and condensate between silanol groups with hydrogen bonds formed, which results in forming a siloxane bond that is a strong chemical bond. Therefore, a coating having a siloxane bond-based three-dimensional network structure is assumed to be formed by using the compound (A) obtained by modifying the silicic acid (a) with the hydrolysate (b) of the epoxy group-having silane coupling agent, and characteristics excellent in heat resistance, adhesion, and water resistance are obtained. Further, it is assumed that a hydroxyl group other than the silanol group in the hydrolysate (b) of the epoxy group-having silane coupling agent allows the compound (A) to stably exist in the surface treatment agent for metal material and contributes to the adhesion. Hereinafter, the silicic acid (a) which is a starting material of the compound (A) and the hydrolysate (b) of the epoxy group-having silane coupling agent will be explained in detail.

(1-1-1-1. Raw Material of Compound (A))
1-1-1-1. A Silicic Acid (a)

The silicic acid (a) is an oxygen acid or oxygen acid salt of silicon which contains silicon and oxygen as main constituent elements and the kind thereof is not particularly limited. Examples thereof include (1) alkali metal silicates such as sodium silicate, potassium silicate, and a lithium silicate; (2) products obtained by forming primary particles by removing sodium, potassium or lithium from the alkali metal silicate by an ion exchange method and allowing the resulting particles to solate to form high order particles, etc.; (3) products produced by combustion oxidation of silicon chloride in air; and (4) a hydrolysate of alkoxysilane, etc. From the viewpoint of the fact that the water resistance of the coating to be obtained is more excellent, the silicic acid (a) is preferably (2) and (4) above, and more preferably (4).

The shape of the silicic acid (a) is not particularly limited and examples thereof include a spherical shape and a non-spherical shape such as a chain-like or scale-like shape. From the viewpoint of the fact that the water resistance of the coating to be obtained is more excellent, the spherical shape is preferred. Further, the average particle diameter of the silicic acid (a) is not particularly limited and the average particle diameter of the silicic acid (a) is preferably in the range of 1 nm to 50 nm, more preferably in the range of 15 nm or less, and particularly preferably in the range of 9 nm or less from the viewpoint of the fact that the water resistance of the coating to be obtained is more excellent. The mean particle diameter of the silicic acid (a) is a number average particle diameter and is measured by a nitrogen adsorption method.

The silicic acid (a) is easily available. Examples of a water dispersion of the silicic acid (a) which is obtained by forming primary particles by removing sodium, potassium or lithium from alkali metal silicate by an ion exchange method and allowing the resulting particles to solate to form high order particles and has a spherical shape include SNOWTEX C, SNOWTEX CS, SNOWTEX CM, SNOWTEX O, SNOWTEX OS, SNOWTEX OM, SNOWTEX NS, SNOWTEX N, SNOWTEX NM, SNOWTEX S, SNOWTEX 20, SNOWTEX 30, and SNOWTEX 40 (all from Nissan Chemical Industries, Ltd.), ADELITE AT-20N, ADELITE AT-20A, and ADELITE AT-20Q (ADEKA Corporation). Examples of a water dispersion of the silicic acid (a) which has a non-spherical shape (a chain-like or scale-like shape) include SNOWTEX UP, SNOWTEX OUP, SNOWTEX PS-S, SNOWTEX PS-SO, SNOWTEX PS-M, SNOWTEX PS-MO, SNOWTEX PS-L, and SNOWTEX PS-LO (all from Nissan Chemical Industries, Ltd.). Further, examples of products produced by combustion oxidation of silicon chloride in air include Aerosil 50, Aerosil 130, Aerosil 200, Aerosil 300, Aerosil 380, Aerosil TT600, Aerosil MOX80, and Aerosil MOX170 (all from Nippon Aerosil Co., Ltd.). Examples of the hydrolysate of alkoxysilane include a hydrolysate of tetramethoxysilane and a hydrolysate of tetraethoxysilane. These may be used singly or in mixture of two or more kinds thereof.

1-1-1-1-2. Hydrolysate (b) of Epoxy Group-Having Silane Coupling Agent

The hydrolysate (b) of the epoxy group-having silane coupling agent with which the silicic acid (a) is modified is, for example, a compound represented by the following formula (1):

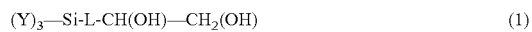

(Y)$_3$—Si-L-CH(OH)—CH$_2$(OH)    (1)

In Formula (1), L represents a divalent linking group. Y independently represents an alkyl group having 1 to 4 carbon atoms, an alkoxy group having 1 to 4 carbon atoms, or a hydroxyl group, and contains at least one hydroxyl group. In Formula (1), —CH(OH)—CH$_2$(OH) is, for example, a structure obtained by ring-opening an epoxy group by water (hydrolysis of the epoxy group).

In Formula (1), L represents a divalent linking group. The divalent linking group represented by L is not particularly limited and is, for example, —C$_n$H$_{2n}$— (n represents an integer), —O—, S—, CO—, NH—, SO$_2$—, —COO—, —CONH— or one group selected from these groups or a group combining at least two or more groups. —C$_n$H$_{2n}$— which is a divalent linking group (n is an integer) is preferably —C$_n$H$_{2n}$— (n is an integer of 1 to 20), more preferably —C$_n$H$_{2n}$— (n is an integer of 2 to 8), and still more preferably —C$_n$H$_{2n}$— (n is an integer of 3 to 5) from the viewpoint of the fact that the water resistance of the coating to be obtained is more excellent. Further, —C$_n$H$_{2n}$—O— which is a divalent linking group (n is an integer) is preferably —C$_n$H$_{2n}$—O— (n is an integer of 1 to 20), more preferably —C$_n$H$_{2n}$—O— (n is an integer of 1 to 8), still more preferably —C$_n$H$_{2n}$—O— (n is an integer of 2 to 8), and most preferably —C$_n$H$_{2n}$—O— (n is an integer of 3 to 5) from the viewpoint of the fact that the water resistance of the coating to be obtained is more excellent.

The method of producing the hydrolysate (b) of the epoxy group-having silane coupling agent is not particularly limited and is, for example, a method of adding water to organoalkoxysilane having an epoxy group in the presence of an acid catalyst. The ring-opening of an epoxy group can be confirmed by measuring epoxy equivalent in accordance with an indicator titration method of JIS K7236.

The hydrolysate (b) of the epoxy group-having silane coupling agent contains at least one hydroxyl group bonded to silicon. The method of producing the hydrolysate (b) is not particularly limited and is, for example, a method of hydrolyzing an alkoxy group bound to silicon in the presence of an acid catalyst. The formation of the hydroxyl group can be confirmed by quantifying the amount of alcohol made as a byproduct when the alkoxy group bound to silicon hydrolyzes. For example, when the amount of alcohol corresponding to 3 mols is detected relative to organoalkoxysilane having three alkoxy groups bound to silicon, the number of the hydroxyl group bound to silicon is 3. Further, the method of measuring the concentration of alcohol is not particularly limited and examples thereof include chromatography such as gas chromatography or ion chromatography and nuclear magnetic resonance spectroscopy.

Here, the organoalkoxysilane having an epoxy group, which is a raw material for production of the hydrolysate (b) of the epoxy group-having silane coupling agent, is not particularly limited and examples thereof include 3-glycidoxypropyltrimetoxysilane, 3-glycidoxypropyltriethoxysilane, 3-glycidoxypropylmethyldimethoxysilane, 3-glycidoxypropylmethyldiethoxysilane, and 3-glycidoxyoctyltrimethoxysilane. From the viewpoint of the fact that the water resistance of the coating to be obtained is more excellent, the organoalkoxysilane is preferably 3-glycidoxyoctyltrimethoxysilane, 3-glycidoxypropyltrimetoxysilane or 3-glycidoxypropyltriethoxysilane and more preferably 3-glycidoxypropyltrimetoxysilane or 3-glycidoxypropyltriethoxysilane. These may be used singly or in mixture of two or more kinds thereof.

1-1-1-1-3. Acid Catalyst (C)

The kind of the acid catalyst (the ring-opening of an epoxy group and the hydrolysis of an alkoxy group bound to silicon) is not particularly limited and examples thereof include (1) carboxylic acids (monocarboxylic acid, and polyvalent carboxylic acids such as dicarboxylic acid, and tricarboxylic acid) as organic acid, such as formic acid, acetic acid, butyric acid, oxalic acid, succinic acid, lactic acid, L-ascorbic acid, tartaric acid, citric acid, DL-malic acid, malonic acid, maleic acid, phthalic acid; (2) phosphonic acids such as nitrilotrismethylene phosphonic acid, nitrilotrispropylene phosphonic acid, nitrilodiethylmethylene phosphonic acid, methane-1-hydroxy-1,1-diphosphonic acid, ethane-1-hydroxy-1,1-diphosphonic acid, propane-1-hydroxy-1,1-diphosphonic acid; (3) sulfonic acids such as methanesulfonic acid and benzenesulfonic acid; and (4) phosphoric acids as inorganic acids. The acid catalyst remains in the coating even after coating formation. In light of this situation, an organic acid is preferred and a carboxylic acid more preferred from the viewpoint of the fact that the water resistance of the coating to be obtained after the heat test is excellent. These may be used singly or in mixture of two or more kinds thereof.

In hydrolysis of the epoxy group-having silane coupling agent, the ring-opening of an epoxy group and the hydrolysis of an alkoxy group are not particularly limited. Based on the total mole number of epoxy and alkoxy groups, 90% by mole or more is preferred (90 to 100% by mole), 95% by mole or more is more preferred, 97% by mole or more, 98% by mole or more, and 99% by mole or more are still more preferred in this order, 100% by mole is most preferred. In hydrolysis of the epoxy group-having silane coupling agent, the ring-opening of the epoxy group and/or the hydrolysis of the alkoxy group are not necessarily to be completely (i.e., 100% by mole) performed. In other words, a moiety which has non-ring opened epoxy groups or a moiety which has alkoxy groups partially or completely remaining in a molecule may be present as a component derived from the epoxy group-having silane coupling agent existing in the agent. The ingredient derived from the epoxy group-having silane coupling agent, in which at least one of the ring-opening of an epoxy group and the hydrolysis of an alkoxy group is not performed, is not particularly limited based on the total mass of the epoxy group-having silane coupling agent added to the agent, and the total amount thereof is preferably 20% by mass or less (20 to 0%), more preferably 10% by mass or less, still more preferably 6% by mass or less, 4% by mass or less, and 2% by mass or less in this order, and most preferably 0% by mass (including less than 1%). The method of measuring the mass of the ingredient is not particularly limited and examples thereof include chromatography such as liquid chromatography, gas chromatography, and ion chromatography and nuclear magnetic resonance spectroscopy.

(1-1-1-2. Method of Producing Compound (A))

The method of producing a compound (A), i.e., a method of modifying a silicic acid (a) with a hydrolysate (b) of an epoxy group-having silane coupling agent is, for example, a method of modifying a silicic acid (a) with a hydrolysate (b) of an epoxy group-having silane coupling agent by preparing an intermediate treatment agent which contains the silicic acid (a), the epoxy group-having silane coupling agent, an acid catalyst and water and to which other ingredients are not intentionally added {the hydrolysate (b) of the epoxy group-having silane coupling agent is formed in the intermediate treatment agent}. This is because when another ingredient other than the above-described those is contained in the intermediate treatment agent, the hydrolysate (b) of the epoxy group-having silane coupling agent reacts with another ingredient other than the silicic acid (a), thereby making it difficult to modify the silicic acid (a) with the hydrolysate (b) of the epoxy group-having silane coupling agent.

The pH of the intermediate treatment agent under the conditions where the silicic acid (a) is modified with the hydrolysate (b) of the epoxy group-having silane coupling agent is not particularly limited, and is preferably 1.5 to 10, more preferably 2.0 to 6.0, and particularly preferably 2.5 to 5.0, from the viewpoint of the fact that the adhesion and water resistance of the coating to be obtained are more excellent. Here, the pH value is a value measured by the same method as the method described in <Liquid Characteristics> below. When the pH is 1.5 to 10, the polymerization of the epoxy group-having silane coupling agents hardly proceed and it becomes easier to modify the silicic acid (a) with the hydrolysate (b) of the epoxy group-having silane coupling agent. Further, the concentration of the hydrolysate (b) of the epoxy group-having silane coupling agent in the intermediate treatment agent containing the silicic acid (a) and the hydrolysate (b) of the epoxy group-having silane coupling agent is not particularly limited and is preferably 1 to 60% by mass, more preferably 5 to 50% by mass, and particularly preferably 10 to 40% by mass based on the total mass of the intermediate treatment agent (liquid), from the viewpoint of the fact that the adhesion and water resistance of the coating to be obtained are more excellent. When the concentration of the hydrolysate (b) of the epoxy group-having silane coupling agent is 1% by mass or more, it becomes easier to modify the silicic acid (a) with the hydrolysate (b) of the epoxy group-having silane coupling agent (it takes a shorter time), meanwhile, when it is 60% by mass or less, the polymerization of the epoxy group-having silane coupling agents does not further proceed and it becomes easier to modify the silicic acid (a) with the hydrolysate (b) of the epoxy group-having silane coupling agent. Further, the solution temperature of the intermediate treatment agent, under the conditions that the silicic acid (a) is modified with the hydrolysate (b) of the epoxy group-having silane coupling agent, is not particularly limited, and is preferably 30 to 80° C., from the viewpoint of the fact that the adhesion and water resistance of the coating to be obtained are more excellent. When the solution temperature of the intermediate treatment agent is 30° C. to 80° C., the silicic acid (a) can be efficiently modified with the hydrolysate (b) of the epoxy group-having silane coupling agent.

{1-1-2. A Silicic Acid (B)}

The surface treatment agent for metal material of the present invention contains a silicic acid (B). The silicic acid (B) is $M_2O \cdot SiO_2$ (wherein M represents an alkali metal; the mass ratio of $M_2O$ to $SiO_2$ is 0.1 to 1, and it is preferably 0.13 to 0.4 and more preferably 0.15 to 0.3 from the viewpoint of the fact that the adhesion of the coating to be obtained after the heat test is more excellent). The method of producing the silicic acid (B) is not particularly limited and examples thereof include (1) a melting method including: melting quartz sand and soda ash at a high temperature to form glass; and dissolving the glass in water; and (2) a direct synthesizing method including dissolving powdery quartz sand or soluble silica in caustic soda without forming glass. Further, an alkali metal component M may be an alkali metal component consisting of sodium, potassium, and lithium. Particularly, silicate of a sodium component which is usually used from the viewpoint of production cost or production process, is preferred. These may be used singly or in mixture of two or more kinds thereof.

{1-1-3. Other Arbitrary Ingredients}

To the surface treatment agent for metal material of the present invention, a leveling agent for improving wettability to the base material, a coating-forming assistant for improving coating formability, an organic or inorganic crosslinker for making the coating stronger, a water-soluble solvent with high volatility for improving drying property, a defoamant for suppressing foaming, a thickener for controlling viscosity, a surfactant for applying lubricity to the base material, or WAX, and further a rust preventive agent, a filler, a colorant or the like, if necessary may be added at an arbitrary rate within the range not impairing the spirit of the present invention and the coating performance.

{1-1-4. Liquid Medium}

A liquid medium contains water as a main ingredient (e.g., 90% by volume based on the volume of the whole solvent).

<1-2. Blending Ratio>

(1-2-1.B/A)

The mass ratio (B/A) of the compound (A) and the silicic acid (B) is 1.1 to 17.9, preferably 1.5 to 8.9, and more preferably 2.2 to 6.9. When the B/A is 1.1 to 17.9, the water resistance after the heat test is more excellent.

(1-2-2.a/b)

The mass ratio (a/b) of the silicic acid (a) to the hydrolysate (b) of the epoxy group-having silane coupling agent is not particularly limited, and is preferably 0.07 to 6.36, more preferably 0.14 to 2.41, and still more preferably 0.37 to 1.39 from the viewpoint of the fact that the adhesion and water resistance of the coating to be obtained are more excellent.

<1-3. Liquid Characteristics>

The pH of the surface treatment agent for metal material of the present invention is not particularly limited, and is preferably in the range of 8.0 to 11.5, more preferably in the range of 8.5 to 11.0, and particularly preferably in the range of 9.0 to 10.5. When the pH is 8.0 to 11.5, the solution stability is more excellent. The pH is a value measured at 25° C. using a pH measurement device (DKK-TOA CORPORATION, pH meter MM-60R).

<<2. Method of Using Surface Treatment Agent for Metal Material (Method of Producing Metal Material Having Surface Treatment Coating)>>

<2-1. Target Base Material>

The target material that is brought into contact with the surface treatment agent for metal material of the present invention will be described. The surface treatment agent for metal material of the present invention is not particularly limited, and may be applied to metal materials, such as an iron-based metal material, a zinc-plated-based steel sheet, an aluminum-based metal material, a magnesium-based metal material, a nickel-based metal material, a titanium-based metal material, a zirconium-based metal material, a copper-based metal material, and a tin-based metal material. The surface treatment agent for metal material of the present invention can be appropriately applied, particularly to a metal material for electronic device that is used for an electronic component and a micro device component. In the following explanation of the surface treatment method, the target base material is used as the metal material for electronic device, however the target material, to which the surface treatment agent for metal material of the present invention is applied, is not limited thereto.

<2-2. Surface Treatment Method>

{2-2-1. Pretreating Step}

If necessary, the metal material may be pretreated in order to remove oil and impurities on the metal material surface before applying the surface treatment agent for metal material according to the present invention. For example, the metal material is coated with a rust preventive oil for preventing rust or a press oil at the time of pressing in many cases. Even when the metal material is not coated with oil, there are oil, impurities and the like attached thereon during the operation. The metal material surface is purified by performing the pretreatment whereby the surface is likely to be uniformly wet. The pretreatment method is not particularly limited and examples thereof include methods such as hot-water rinsing, solvent cleaning, cleaning by alkaline degreasing, and acid pickling. When the material surface has neither oil nor impurities and is uniformly wet with the surface treatment agent for metal material of the present invention, the pretreating step is not particularly needed.

{2-2-2. Contacting Step}

The surface treatment agent for metal material is more preferably used as a coating type surface treatment agent. Here, the method of bringing the surface treatment agent for metal material of the present invention into contact with the metal material is not particularly limited as long as the surface treatment agent for metal material can be uniformly brought into contact with the metal material surface, and examples thereof include a roll coating method, a dip coating method, and a spray coating method.

{2-2-3. Drying Step}

The peak maximum temperature (PMT) when drying the coating formed on the metal material surface is not particularly limited, and is 60 to 300° C. from the viewpoint of the fact that the adhesion of the coating to be obtained after being exposed to high temperature is more excellent. This temperature range may be arbitrarily changed in the range depending on the kind of the resin component, coating thickness and the base material to be applied, and is more preferably 80 to 280° C. In the case of 300° C. or less, any special facilities are not needed and the industrial application range is extremely wide. The heating and drying method is not particularly limited, and the metal surface treatment agent may be dried by heating with hot air, an induction heater, infrared rays, near infrared rays or the like in an air environment. Further, the optimal conditions of the heating time are appropriately selected depending on, for example, the size of the metal material to be used (board width, board thickness), the speed of processing line, and the kind of compounds in the metal surface treatment agent.

{2-2-4. Arbitrary: Upper Layer Coating Forming Step}

Further, an upper layer coating may be formed on the coating derived from the surface treatment agent for metal material. The upper layer coating can be formed by applying the surface treatment agent for upper layer coating and drying it. Here, the surface treatment agent for upper layer coating is preferably used as the coating type surface treatment agent. The upper layer coating is formed in order to mainly give higher electrical insulation to the metal material. The surface treatment agent for upper layer coating is preferably a silicone resin and more preferably a methylphenyl-based silicone resin. Further, it may contain a color pigment, a rust preventive pigment, a functional pigment having thermal conductivity or the like, if necessary. Furthermore, the heating temperature when drying the coating is preferably 300° C. or less and more preferably 280° C. or less. In the case of 300° C. or less, any special facilities are not needed and the industrial application range is extremely wide.

<<3. Metal Material Having Surface Treatment Coating>>

The metal material having surface treatment coating according to the present invention has a surface treatment coating derived from the surface treatment agent for metal material according to the present invention on the metal base material, and arbitrarily has an upper layer coating on the surface treatment coating.

<3-1. Surface Treatment Method>

(Coating Amount)

The coating amount of the coating after bringing the surface treatment agent for metal material into contact with the surface of the metal material and drying it is not particularly limited, and is preferably 0.1 to 10 g/m$^2$ and more preferably 0.5 to 5.0 g/m$^2$ from the viewpoint of the fact that the water resistance of the coating to be obtained after the heat test is more excellent.

scattering type particle size distribution meter: LA-920 (manufactured by HORIBA, Ltd.).

TABLE 1

| Symbol | Silicic acid (a) | Characteristics |
|---|---|---|
| a1 | Hydrolysate of tetraethoxysilane (manufactured by Shin-Etsu Chemical Co., Ltd.) | Average particle diameter: 3 nm, Shape: spherical shape |
| a2 | Hydrolysate of tetraethoxysilane (manufactured by Shin-Etsu Chemical Co., Ltd.) | Average particle diameter: 1 nm, Shape: spherical shape |
| a3 | Hydrolysate of tetraethoxysilane (manufactured by Shin-Etsu Chemical Co., Ltd.) | Average particle diameter: 9 nm, Shape: spherical shape |
| a4 | Hydrolysate of tetraethoxysilane (manufactured by Shin-Etsu Chemical Co., Ltd.) | Average particle diameter: 15 nm, Shape: spherical shape |
| a5 | Hydrolysate of tetraethoxysilane (manufactured by Shin-Etsu Chemical Co., Ltd.) | Average particle diameter: 50 nm, Shape: spherical shape |
| a6 | Hydrolysate of tetraethoxysilane (manufactured by Shin-Etsu Chemical Co., Ltd.) | Average particle diameter: 70 nm, Shape: spherical shape |
| a7 | Snowtech OS (manufactured by Nissan Chemical Industries, Ltd.) | Average particle diameter: 3 nm, Shape: spherical shape |
| a8 | Potassium silicate (manufactured by Nippon Chemical Industries, Co., Ltd.) | Average particle diameter: 3 nm, Shape: spherical shape |
| a9 | Aerosil 200 (manufactured by NIPPON AEROSIL CO., LTD.) | Average particle diameter: 3 nm, Shape: spherical shape |
| a10 | Hydrolysate of tetraethoxysilane (manufactured by Shin-Etsu Chemical Co., Ltd.) | Average particle diameter: 3 nm, Shape: non-spherical shape |

<3-2. Upper Layer Coating>

The thickness of an upper layer coating is preferably 1 to 100 μm and more preferably 5 to 30 μm.

As described above, the present invention attains a surface treatment agent having excellent heat resistance in high-temperature environments and achieves long-term use of an electronic component.

EXAMPLES

Hereinafter, effects of the present invention will be specifically described by examples. However, the following examples do not limit the present invention.

(1) Sample Material (Material)

The following commercially available material was used as a sample material:

(M1) Cold rolled steel sheet SPCC-SD: 0.8 mm in thickness (2) Pretreatment (Washing)

Hereinafter, the method of producing a test plate will be explained. The surface of the sample material was treated using a fine cleaner E6406 manufactured by Nihon Parkerizing Co., Ltd. to remove oil and impurities on the surface. Then, the resulting material was washed with tap water and 100% of the surface was confirmed to be wet with water. After that, pure water was poured thereon, water was removed in an oven at 100° C., and the resulting product was used as the test plate.

(3) Preparation of Surface Treatment Agent for Metal Material

<Compound A>

The silicic acid of Table 1 (a), the hydrolysate (b) of the epoxy group-having silane coupling agent of Table 2, and the acid catalyst (C) of Table 3 were used to prepare a compound A. The average particle diameters in the following Tables were values measured by a laser diffraction/

TABLE 2

| Symbol | Hydrolysate (b) of an epoxy group-having silane coupling agent |
|---|---|
| b1 | Hydrolysate of 3-glycidoxypropyltrimethoxysilane (manufactured by Shin-Etsu Chemical Co., Ltd.) |
| b2 | Hydrolysate of 3-glycidoxyoctyltrimethoxysilane (manufactured by Shin-Etsu Chemical Co., Ltd.) |

TABLE 3

| Symbol | Compound C |
|---|---|
| C1 | Tartaric acid (manufactured by Wako Pure Chemical Industries, Ltd.) |
| C2 | Sulfonic acid (manufactured by Wako Pure Chemical Industries, Ltd.) |
| C3 | Phosphoric acid (manufactured by Wako Pure Chemical Industries, Ltd.) |

<Method of Preparing Compound A>

The compound (A) was produced by adding the silicic acid (a) of Table 1, the epoxy group-having silane coupling agent of Table 2, and the acid catalyst (C) of Table 3 to deionized water in accordance with the compound A preparation conditions (A1 to A14) shown in Table 4. The epoxy group-having silane coupling agent was hydrolyzed by rotating an eggplant type flask equipped with a refluxing pipe at a reflux temperature of 20° C. on a water bath at 60° C. in the atmosphere. At that time, the measurements of both the epoxy equivalent and the free alcohol amount were continued until when both the ring-opening of an epoxy group and the hydrolysis to a silanol group were completely (100%) performed.

TABLE 4

| | Production conditions of Compound A | | |
|---|---|---|---|
| Symbol | pH | Concentration (%) | Temperature (° C.) |
| A1 | 3.8 | 25 | 60 |
| A2 | 2.5 | 25 | 60 |
| A3 | 5 | 25 | 60 |
| A4 | 2 | 25 | 60 |
| A5 | 6 | 25 | 60 |
| A6 | 1.5 | 25 | 60 |
| A7 | 10 | 25 | 60 |
| A8 | 11 | 25 | 60 |
| A9 | 3.8 | 10 | 60 |
| A10 | 3.8 | 40 | 60 |
| A11 | 3.8 | 5 | 60 |
| A12 | 3.8 | 50 | 60 |
| A13 | 3.8 | 1 | 60 |
| A14 | 3.8 | 60 | 60 |

<Silicic Acid (B)>

The silicic acid (B): potassium silicate (manufactured by Nippon Chemical Industrial CO., LTD.), Snowtech N (manufactured by Nissan Chemical Industries, Ltd.), and $K_2O$ (manufactured by Wako Pure Chemical Industries, Ltd.) were mixed and adjusted to have a mass ratio of $M_2O$ to $SiO_2$ shown in Table 5. Each of the average particle diameters was 10 to 12 nm. The average particle diameter measurement conditions are as the same as those of the silicic acid (a).

TABLE 5

| Symbol | Ratio of $M_2O$ to $SiO_2$ |
|---|---|
| B1 | 0.23 |
| B2 | 0.15 |
| B3 | 0.3 |
| B4 | 0.13 |
| B5 | 0.4 |
| B6 | 0.1 |
| B7 | 1.0 |
| B8 | 0.05 |
| B9 | 2 |

Table 6 is a table showing surface treatment agents for metal material according to the present examples and the present comparative examples (ingredients and the ratio of each ingredients and pH). Here, the silicic acid (a) and the hydrolysate (b) of the epoxy group-having silane coupling agent as a constituents of the compound (A) and the silicic acid (B) were added at the ratios (% by mass) shown in Table 6 based on the total solid content of the surface treatment agent for metal material {the total of the solid contents of the silicic acid (a), the hydrolysate (b) of the epoxy group-having silane coupling agent, the silicic acid (B), and the acid catalyst (C)}, and the resulting mixture was adjusted with deionized water to form surface treatment agents for metal material according to the present examples and the present comparative examples (solid content concentration: 5 to 10% by mass). A main ingredient other than the silicic acid (a), the hydrolysate (b) of the epoxy group-having silane coupling agent, the silicic acid (B), and the acid catalyst (C) shown in Table 6 is water. In Table 6, "% by mass" indicates "% by mass" based on the total solid content in the surface treatment agent for metal material. Further, in Table 6, "B/A" or "a/b" represents a mass ratio. Since the acid catalyst is not added in Comparative example 7, the value described in the item of "the hydrolysate (b) of the epoxy group-having silane coupling agent" in Comparative example 7 indicates not "the hydrolysate (b) of the epoxy group-having silane coupling agent", but a non-hydrolyzed "epoxy group-having silane coupling agent".

TABLE 6

| | Surface treatment agent for metal material | | | | | | | | | | |
|---|---|---|---|---|---|---|---|---|---|---|---|
| | Compound (A) | | | | | | | | | | |
| Example/ Comparative Example | Silicic acid (a) | | Hydrolysate (b) of an epoxy group-having silane coupling agent | | Mass ratio a/b | Silicic acid (B) | | Acid catalyst (C) | | Mass ratio B/A | pH |
| | Production method | Kind | % by mass | Kind | % by mass | | Kind | % by mass | Kind | % by mass | | |
| Example 1 | A1 | a1 | 9.1% | b1 | 9.3% | 0.98 | B1 | 81.1% | C1 | 0.5% | 4.4 | 9.8 |
| Example 2 | A1 | a2 | 9.1% | b1 | 9.3% | 0.98 | B1 | 81.1% | C1 | 0.5% | 4.4 | 9.8 |
| Example 3 | A1 | a3 | 9.1% | b1 | 9.3% | 0.98 | B1 | 81.1% | C1 | 0.5% | 4.4 | 9.8 |
| Example 4 | A1 | a4 | 9.1% | b1 | 9.3% | 0.98 | B1 | 81.1% | C1 | 0.5% | 4.4 | 9.8 |
| Example 5 | A1 | a5 | 9.1% | b1 | 9.3% | 0.98 | B1 | 81.1% | C1 | 0.5% | 4.4 | 9.8 |
| Example 6 | A1 | a6 | 9.1% | b1 | 9.3% | 0.98 | B1 | 81.1% | C1 | 0.5% | 4.4 | 9.8 |
| Example 7 | A1 | a7 | 9.1% | b1 | 9.3% | 0.98 | B1 | 81.1% | C1 | 0.5% | 4.4 | 9.8 |
| Example 8 | A1 | a8 | 9.1% | b1 | 9.3% | 0.98 | B1 | 81.1% | C1 | 0.5% | 4.4 | 9.8 |
| Example 9 | A1 | a9 | 9.1% | b1 | 9.3% | 0.98 | B1 | 81.1% | C1 | 0.5% | 4.4 | 9.8 |
| Example 10 | A1 | a10 | 9.1% | b1 | 9.3% | 0.98 | B1 | 81.1% | C1 | 0.5% | 4.4 | 9.8 |
| Example 11 | A2 | a1 | 9.1% | b1 | 9.3% | 0.98 | B1 | 81.1% | C1 | 0.5% | 4.4 | 9.8 |
| Example 12 | A3 | a1 | 9.1% | b1 | 9.3% | 0.98 | B1 | 81.1% | C1 | 0.5% | 4.4 | 9.8 |
| Example 13 | A4 | a1 | 9.1% | b1 | 9.3% | 0.98 | B1 | 81.1% | C1 | 0.5% | 4.4 | 9.8 |
| Example 14 | A5 | a1 | 9.1% | b1 | 9.3% | 0.98 | B1 | 81.1% | C1 | 0.5% | 4.4 | 9.8 |
| Example 15 | A6 | a1 | 9.1% | b1 | 9.3% | 0.98 | B1 | 81.1% | C1 | 0.5% | 4.4 | 9.8 |
| Example 16 | A7 | a1 | 9.1% | b1 | 9.3% | 0.98 | B1 | 81.1% | C1 | 0.5% | 4.4 | 9.8 |
| Example 17 | A8 | a1 | 9.1% | b1 | 9.3% | 0.98 | B1 | 81.1% | C1 | 0.5% | 4.4 | 9.8 |
| Example 18 | A9 | a1 | 9.1% | b1 | 9.3% | 0.98 | B1 | 81.1% | C1 | 0.5% | 4.4 | 9.8 |
| Example 19 | A10 | a1 | 9.1% | b1 | 9.3% | 0.98 | B1 | 81.1% | C1 | 0.5% | 4.4 | 9.8 |
| Example 20 | A11 | a1 | 9.1% | b1 | 9.3% | 0.98 | B1 | 81.1% | C1 | 0.5% | 4.4 | 9.8 |

TABLE 6-continued

Surface treatment agent for metal material

| | | Compound (A) | | | | | | | | | |
| | | Silicic acid (a) | | Hydrolysate (b) of an epoxy group-having silane coupling agent | | Mass | Silicic acid (B) | | Acid catalyst (C) | | Mass |
| Example/ Comparative Example | Production method | Kind | % by mass | Kind | % by mass | ratio a/b | Kind | % by mass | Kind | % by mass | ratio B/A | pH |
|---|---|---|---|---|---|---|---|---|---|---|---|---|
| Example 21 | A12 | a1 | 9.1% | b1 | 9.3% | 0.98 | B1 | 81.1% | C1 | 0.5% | 4.4 | 9.8 |
| Example 22 | A13 | a1 | 9.1% | b1 | 9.3% | 0.98 | B1 | 81.1% | C1 | 0.5% | 4.4 | 9.8 |
| Example 23 | A14 | a1 | 9.1% | b1 | 9.3% | 0.98 | B1 | 81.1% | C1 | 0.5% | 4.4 | 9.8 |
| Example 24 | A1 | a1 | 9.1% | b2 | 9.3% | 0.98 | B1 | 81.1% | C1 | 0.5% | 4.4 | 9.8 |
| Example 25 | A1 | a1 | 9.1% | b1 | 9.3% | 0.98 | B1 | 81.1% | C2 | 0.5% | 4.4 | 9.8 |
| Example 26 | A1 | a1 | 9.1% | b1 | 9.3% | 0.98 | B1 | 81.1% | C3 | 0.5% | 4.4 | 9.8 |
| Example 27 | A1 | a1 | 9.1% | b1 | 9.3% | 0.98 | B2 | 81.1% | C1 | 0.5% | 4.4 | 9.8 |
| Example 28 | A1 | a1 | 9.1% | b1 | 9.3% | 0.98 | B3 | 81.1% | C1 | 0.5% | 4.4 | 9.8 |
| Example 29 | A1 | a1 | 9.1% | b1 | 9.3% | 0.98 | B4 | 81.1% | C1 | 0.5% | 4.4 | 9.8 |
| Example 30 | A1 | a1 | 9.1% | b1 | 9.3% | 0.98 | B5 | 81.1% | C1 | 0.5% | 4.4 | 9.8 |
| Example 31 | A1 | a1 | 9.1% | b1 | 9.3% | 0.98 | B6 | 81.1% | C1 | 0.5% | 4.4 | 9.8 |
| Example 32 | A1 | a1 | 9.1% | b1 | 9.3% | 0.98 | B7 | 81.1% | C1 | 0.5% | 4.4 | 9.8 |
| Example 33 | A1 | a1 | 15.3% | b1 | 15.6% | 0.98 | B1 | 68.6% | C1 | 0.5% | 2.2 | 9.8 |
| Example 34 | A1 | a1 | 6.5% | b1 | 6.6% | 0.98 | B1 | 86.4% | C1 | 0.5% | 6.6 | 9.8 |
| Example 35 | A1 | a1 | 19.9% | b1 | 20.4% | 0.98 | B1 | 59.2% | C1 | 0.5% | 1.5 | 9.8 |
| Example 36 | A1 | a1 | 5.0% | b1 | 5.1% | 0.98 | B1 | 89.4% | C1 | 0.5% | 8.9 | 9.8 |
| Example 37 | A1 | a1 | 23.4% | b1 | 24.0% | 0.98 | B1 | 52.1% | C1 | 0.5% | 1.1 | 9.8 |
| Example 38 | A1 | a1 | 2.6% | b1 | 2.7% | 0.96 | B1 | 94.2% | C1 | 0.5% | 4.4 | 9.8 |
| Example 39 | A1 | a1 | 5.0% | b1 | 13.4% | 0.37 | B1 | 81.1% | C1 | 0.5% | 4.4 | 9.8 |
| Example 40 | A1 | a1 | 10.7% | b1 | 7.7% | 1.39 | B1 | 81.1% | C1 | 0.5% | 4.4 | 9.8 |
| Example 41 | A1 | a1 | 2.3% | b1 | 16.1% | 0.14 | B1 | 81.1% | C1 | 0.5% | 4.4 | 9.8 |
| Example 42 | A1 | a1 | 13.0% | b1 | 5.4% | 2.41 | B1 | 81.1% | C1 | 0.5% | 4.4 | 9.8 |
| Example 43 | A1 | a1 | 1.2% | b1 | 17.2% | 0.07 | B1 | 81.1% | C1 | 0.5% | 4.4 | 9.8 |
| Example 44 | A1 | a1 | 15.9% | b1 | 2.5% | 6.36 | B1 | 81.1% | C1 | 0.5% | 4.4 | 9.8 |
| Example 45 | A1 | a1 | 0.1% | b1 | 18.3% | 0.01 | B1 | 81.1% | C1 | 0.5% | 4.4 | 9.8 |
| Example 46 | A1 | a1 | 16.7% | b1 | 1.8% | 9.28 | B1 | 81.0% | C1 | 0.5% | 4.4 | 9.8 |
| Example 47 | A1 | a1 | 9.1% | b1 | 9.3% | 0.98 | B1 | 81.1% | C1 | 0.5% | 4.4 | 9.0 |
| Example 48 | A1 | a1 | 9.1% | b1 | 9.3% | 0.98 | B1 | 81.1% | C1 | 0.5% | 4.4 | 10.5 |
| Example 49 | A1 | a1 | 9.1% | b1 | 9.3% | 0.98 | B1 | 81.1% | C1 | 0.5% | 4.4 | 8.5 |
| Example 50 | A1 | a1 | 9.1% | b1 | 9.3% | 0.98 | B1 | 81.1% | C1 | 0.5% | 4.4 | 11.0 |
| Example 51 | A1 | a1 | 9.1% | b1 | 9.3% | 0.98 | B1 | 81.1% | C1 | 0.5% | 4.4 | 8.0 |
| Example 52 | A1 | a1 | 9.1% | b1 | 9.3% | 0.98 | B1 | 81.1% | C1 | 0.5% | 4.4 | 11.5 |
| Example 53 | A1 | a1 | 9.1% | b1 | 9.3% | 0.98 | B1 | 81.1% | C1 | 0.5% | 4.4 | 9.8 |
| Example 54 | A1 | a1 | 9.1% | b1 | 9.3% | 0.98 | B1 | 81.1% | C1 | 0.5% | 4.4 | 9.8 |
| Example 55 | A1 | a1 | 9.1% | b1 | 9.3% | 0.98 | B1 | 81.1% | C1 | 0.5% | 4.4 | 9.8 |
| Example 56 | A1 | a1 | 9.1% | b1 | 9.3% | 0.98 | B1 | 81.1% | C1 | 0.5% | 4.4 | 9.8 |
| Example 57 | A1 | a1 | 9.1% | b1 | 9.3% | 0.98 | B1 | 81.1% | C1 | 0.5% | 4.4 | 9.8 |
| Example 58 | A1 | a1 | 9.1% | b1 | 9.3% | 0.98 | B1 | 81.1% | C1 | 0.5% | 4.4 | 9.8 |
| Example 59 | A1 | a1 | 9.1% | b1 | 9.3% | 0.98 | B1 | 81.1% | C1 | 0.5% | 4.4 | 9.8 |
| Example 60 | A1 | a1 | 9.1% | b1 | 9.3% | 0.98 | B1 | 81.1% | C1 | 0.5% | 4.4 | 9.8 |
| Example 61 | A1 | a1 | 9.1% | b1 | 9.3% | 0.98 | B1 | 81.1% | C1 | 0.5% | 4.4 | 9.8 |
| Example 62 | A1 | a1 | 9.1% | b1 | 9.3% | 0.98 | B1 | 81.1% | C1 | 0.5% | 4.4 | 9.8 |
| Example 63 | A1 | a1 | 9.1% | b1 | 9.3% | 0.98 | B1 | 81.1% | C1 | 0.5% | 4.4 | 9.8 |
| Example 64 | A1 | a1 | 9.1% | b1 | 9.3% | 0.98 | B1 | 81.1% | C1 | 0.5% | 4.4 | 9.8 |
| Comparative Example 1 | A1 | | | b1 | 10.2% | | B1 | 89.3% | C1 | 0.5% | | 9.8 |
| Comparative Example 2 | A1 | a1 | 10.0% | | | | B1 | 89.5% | C1 | 0.5% | | 9.8 |
| Comparative Example 3 | A1 | a1 | 49.3% | b1 | 50.2% | 0.98 | | | C1 | 0.5% | | 9.8 |
| Comparative Example 4 | A1 | | | | | | B1 | 99.5% | C1 | 0.5% | | 9.8 |
| Comparative Example 5 | A1 | | | b1 | 99.5% | | | | C1 | 0.5% | | 9.8 |
| Comparative Example 6 | A1 | a1 | 99.5% | | | | | | C1 | 0.5% | | 9.8 |
| Comparative Example 7 | A1 | a1 | 9.2% | b1 | 9.4% | 0.98 | B1 | 81.4% | | | | 9.8 |
| Comparative Example 8 | A1 | a1 | 9.1% | b1 | 9.3% | 0.98 | B8 | 81.1% | C1 | 0.5% | 4.4 | 9.8 |
| Comparative Example 9 | A1 | a1 | 9.1% | b1 | 9.3% | 0.98 | B9 | 81.1% | C1 | 0.5% | 4.4 | 9.8 |
| Comparative Example 10 | A1 | a1 | 28.4% | b1 | 29.1% | 0.98 | B1 | 42.0% | C1 | 0.5% | 0.7 | 9.8 |
| Comparative Example 11 | A1 | a1 | 2.1% | b1 | 2.1% | 0.98 | B1 | 95.3% | C1 | 0.5% | 22.3 | 9.8 |

Upper Layer Coating

T1: methylphenyl-based silicone resin (KR-311, manufactured by Shin-Etsu Chemical Co., Ltd.)

T2: epoxy-based silicone resin (ES-1002T, manufactured by Shin-Etsu Chemical Co., Ltd.)

T3: alkyd-based silicone resin (KR-5206, manufactured by Shin-Etsu Chemical Co., Ltd.)

T4: polyester-based silicone resin (KR-5230, manufactured by Shin-Etsu Chemical Co., Ltd.)

(4) Surface Treatment Method

The surface treatment agent for metal material was applied onto each test plate by a bar coating method and each plate was directly placed in an oven without washing with water and dried at each drying temperature shown in Table 7 to form each coating with each coating amount shown in Table 7. The coating amount indicates a coating amount per one side of the steel sheet. The surface treatment for the upper layer coating is also performed in the same manner and the coating thickness indicates a coating thickness per one side of the steel sheet.

TABLE 7

| Example/Comparative Example | Conditions of test plate production | | | Upper layer film | | |
|---|---|---|---|---|---|---|
| | Steel sheet | Coating amount g/m2 | PMT °C. | Kind | Film thickness μm | PMT °C. |
| Example 1 | M1 | 1.0 | 250 | | | |
| Example 2 | M1 | 1.0 | 250 | | | |
| Example 3 | M1 | 1.0 | 250 | | | |
| Example 4 | M1 | 1.0 | 250 | | | |
| Example 5 | M1 | 1.0 | 250 | | | |
| Example 6 | M1 | 1.0 | 250 | | | |
| Example 7 | M1 | 1.0 | 250 | | | |
| Example 8 | M1 | 1.0 | 250 | | | |
| Example 9 | M1 | 1.0 | 250 | | | |
| Example 10 | M1 | 1.0 | 250 | | | |
| Example 11 | M1 | 1.0 | 250 | | | |
| Example 12 | M1 | 1.0 | 250 | | | |
| Example 13 | M1 | 1.0 | 250 | | | |
| Example 14 | M1 | 1.0 | 250 | | | |
| Example 15 | M1 | 1.0 | 250 | | | |
| Example 16 | M1 | 1.0 | 250 | | | |
| Example 17 | M1 | 1.0 | 250 | | | |
| Example 18 | M1 | 1.0 | 250 | | | |
| Example 19 | M1 | 1.0 | 250 | | | |
| Example 20 | M1 | 1.0 | 250 | | | |
| Example 21 | M1 | 1.0 | 250 | | | |
| Example 22 | M1 | 1.0 | 250 | | | |
| Example 23 | M1 | 1.0 | 250 | | | |
| Example 24 | M1 | 1.0 | 250 | | | |
| Example 25 | M1 | 1.0 | 250 | | | |
| Example 26 | M1 | 1.0 | 250 | | | |
| Example 27 | M1 | 1.0 | 250 | | | |
| Example 28 | M1 | 1.0 | 250 | | | |
| Example 29 | M1 | 1.0 | 250 | | | |
| Example 30 | M1 | 1.0 | 250 | | | |
| Example 31 | M1 | 1.0 | 250 | | | |
| Example 32 | M1 | 1.0 | 250 | | | |
| Example 33 | M1 | 1.0 | 250 | | | |
| Example 34 | M1 | 1.0 | 250 | | | |
| Example 35 | M1 | 1.0 | 250 | | | |
| Example 36 | M1 | 1.0 | 250 | | | |
| Example 37 | M1 | 1.0 | 250 | | | |
| Example 38 | M1 | 1.0 | 250 | | | |
| Example 39 | M1 | 1.0 | 250 | | | |
| Example 40 | M1 | 1.0 | 250 | | | |
| Example 41 | M1 | 1.0 | 250 | | | |
| Example 42 | M1 | 1.0 | 250 | | | |
| Example 43 | M1 | 1.0 | 250 | | | |
| Example 44 | M1 | 1.0 | 250 | | | |
| Example 45 | M1 | 1.0 | 250 | | | |
| Example 46 | M1 | 1.0 | 250 | | | |
| Example 47 | M1 | 1.0 | 250 | | | |
| Example 48 | M1 | 1.0 | 250 | | | |
| Example 49 | M1 | 1.0 | 250 | | | |
| Example 50 | M1 | 1.0 | 250 | | | |
| Example 51 | M1 | 1.0 | 250 | | | |
| Example 52 | M1 | 1.0 | 250 | | | |
| Example 53 | M1 | 1.0 | 60 | | | |
| Example 54 | M1 | 1.0 | 80 | | | |
| Example 55 | M1 | 1.0 | 280 | | | |
| Example 56 | M1 | 1.0 | 300 | | | |
| Example 57 | M1 | 0.5 | 250 | | | |
| Example 58 | M1 | 5.0 | 250 | | | |
| Example 59 | M1 | 0.1 | 250 | | | |
| Example 60 | M1 | 10.0 | 250 | | | |
| Example 61 | M1 | 1.0 | 250 | T1 | 20 | 200 |
| Example 62 | M1 | 1.0 | 250 | T2 | 20 | 200 |
| Example 63 | M1 | 1.0 | 250 | T3 | 20 | 200 |
| Example 64 | M1 | 1.0 | 250 | T4 | 20 | 200 |
| Comparative Example 1 | M1 | 1.0 | 250 | | | |
| Comparative Example 2 | M1 | 1.0 | 250 | | | |
| Comparative Example 3 | M1 | 1.0 | 250 | | | |
| Comparative Example 4 | M1 | 1.0 | 250 | | | |
| Comparative Example 5 | M1 | 1.0 | 250 | | | |
| Comparative Example 6 | M1 | 1.0 | 250 | | | |
| Comparative Example 7 | M1 | 1.0 | 250 | | | |
| Comparative Example 8 | M1 | 1.0 | 250 | | | |
| Comparative Example 9 | M1 | 1.0 | 250 | | | |
| Comparative Example 10 | M1 | 1.0 | 250 | | | |
| Comparative Example 11 | M1 | 1.0 | 250 | | | |

(5) Evaluation Test Method (5-1) Water Resistance

Each test plate was cut out into a size of 70×150 mm, the backside and the edge were sealed with a cellophane tape, and the resulting test piece was evaluated at a temperature of 50° C. and a humidity of 85% until when 5% of rust occurred (area rate).

⊚: it took 120 hours or more until 5% rust was generated;

○: it took 72 hours or more and less than 120 hours until 5% rust was generated;

○Δ: it took 48 hours or more and less than 72 hours until 5% rust was generated;

Δ: it took 24 hours or more and less than 48 hours until 5% rust was generated; and x: it took less than 24 hours until 5% rust was generated.

(5-2) Adhesion 100 grids with 1 mm square were formed in the coating of each test plate in accordance with JIS K5400 and the tape was peeled off and the number of remained squares (where the coating was not peeled off) was evaluated as the grid residual ratio.

⊚: the residual ratio was 95% to 100%;

○: the residual ratio was 90% or more and less than 95%;

○Δ: the residual ratio was 70% or more and less than 90%;

Δ: the residual ratio was 50% or more and less than 70%; and x: the residual ratio was 0% or more and less than 50%.

(5-3) Water Resistance After Heat Test

Each test plate was cut out into a size of 70×150 mm and heated in an oven at 700° C. for 24 hours, followed by being allowed to stand at room temperature for 24 hours. Thereafter, the backside and the edge were sealed with a cellophane tape, and the resulting test piece was evaluated at a temperature of 50° C. and a humidity of 85% until when 5% (area rate) of rust occurred.

⊚+: it took 120 hours or more until 5% rust was generated;

⊚: it took 96 hours or more and less than 120 hours until 5% rust was generated;

○: it took 72 hours or more and less than 96 hours until 5% rust was generated;

○△: it took 48 hours or more and less than 72 hours until 5% rust was generated;

△: it took 24 hours or more and less than 48 hours until 5% rust was generated; and x: it took less than 24 hours until 5% rust was generated.

(5-4) Water Resistance After Heat Test

Each test plate was cut out into a size of 70×150 mm and heated in an oven at 700° C. for 24 hours, followed by being allowed to stand at room temperature for 24 hours. Thereafter, as for the resulting test piece in which the backside and the edge were sealed with a cellophane tape, the number of remained squares (where the coating was not peeled off) was evaluated as the grid residual ratio.

⊚: the residual ratio was 95% to 100%;

○: the residual ratio was 90% or more and less than 95%;

○△: the residual ratio was 70% or more and less than 90%;

△: the residual ratio was 50% or more and less than 70%; and x: the residual ratio was 0% or more and less than 50%.

(5-5) Solution Stability

The treatment agent tightly sealed was stored in a thermostat bath at 40° C. for three months and the solution appearance was visually evaluated.

○: the solution was not changed or slightly thickened, and no precipitates were observed;

○△: the solution was slightly thickened and slight precipitates were observed; and x: the solution was thickened or precipitates were observed.

The metal materials obtained by using the surface treatment agent for metal materials of the Examples and Comparative Examples were subjected to the evaluations (5-1) to (5-3) above, and the results are shown in Table 8. From a practical viewpoint, it is required that there is no "x" in the evaluation items.

TABLE 8

| Example/Comparative Example | Water resistance | Adhesion | Water resistance after heat test | Adhesion after heat test | Solution stability |
|---|---|---|---|---|---|
| Example 1 | ⊚ | ⊚ | ⊚+ | ○ | ○ |
| Example 2 | ⊚ | ⊚ | ⊚+ | ○ | ○ |
| Example 3 | ⊚ | ⊚ | ⊚+ | ○ | ○ |
| Example 4 | ○ | ⊚ | ⊚+ | ○ | ○ |
| Example 5 | ○△ | ⊚ | ⊚+ | ○ | ○ |
| Example 6 | △ | ⊚ | ⊚+ | ○ | ○ |
| Example 7 | ○ | ⊚ | ⊚+ | ○ | ○ |
| Example 8 | ○△ | ⊚ | ⊚+ | ○ | ○ |
| Example 9 | ○△ | ⊚ | ⊚+ | ○ | ○ |
| Example 10 | ○△ | ⊚ | ⊚+ | ○ | ○ |
| Example 11 | ⊚ | ⊚ | ⊚+ | ○ | ○ |
| Example 12 | ⊚ | ⊚ | ⊚+ | ○ | ○ |
| Example 13 | ○ | ○ | ⊚+ | ○ | ○ |
| Example 14 | ○ | ○ | ⊚+ | ○ | ○ |
| Example 15 | ○△ | ○△ | ⊚+ | ○ | ○ |
| Example 16 | ○△ | ○△ | ⊚+ | ○ | ○ |
| Example 17 | △ | △ | ⊚+ | ○ | ○ |
| Example 18 | ⊚ | ⊚ | ⊚+ | ○ | ○ |
| Example 19 | ⊚ | ⊚ | ⊚+ | ○ | ○ |
| Example 20 | ○ | ○ | ⊚+ | ○ | ○ |
| Example 21 | ○ | ○ | ⊚+ | ○ | ○ |
| Example 22 | ○△ | ○△ | ⊚+ | ○ | ○ |
| Example 23 | ○△ | ○△ | ⊚+ | ○ | ○ |
| Example 24 | ○ | ⊚ | ⊚+ | ○ | ○ |
| Example 25 | ⊚ | ⊚ | ○ | ○ | ○ |
| Example 26 | ⊚ | ⊚ | △ | ○ | ○ |
| Example 27 | ⊚ | ⊚ | ⊚+ | ○ | ○ |
| Example 28 | ⊚ | ⊚ | ⊚+ | ○ | ○ |
| Example 29 | ⊚ | ⊚ | ⊚+ | ○△ | ○ |
| Example 30 | ⊚ | ⊚ | ⊚+ | ○△ | ○ |
| Example 31 | ⊚ | ⊚ | ⊚+ | △ | ○ |
| Example 32 | ⊚ | ⊚ | ⊚+ | △ | ○ |
| Example 33 | ⊚ | ⊚ | ⊚+ | ○ | ○ |
| Example 34 | ⊚ | ⊚ | ⊚+ | ○ | ○ |
| Example 35 | ⊚ | ⊚ | ⊚ | ○ | ○ |
| Example 36 | ⊚ | ⊚ | ⊚ | ○ | ○ |
| Example 37 | ⊚ | ⊚ | ○ | ○ | ○ |
| Example 38 | ⊚ | ⊚ | ○ | ○ | ○ |
| Example 39 | ⊚ | ⊚ | ⊚+ | ○ | ○ |
| Example 40 | ⊚ | ⊚ | ⊚+ | ○ | ○ |
| Example 41 | ○ | ○ | ⊚+ | ○ | ○ |
| Example 42 | ○ | ○ | ⊚+ | ○ | ○ |
| Example 43 | ○△ | ○△ | ⊚+ | ○ | ○ |
| Example 44 | ○△ | ○△ | ⊚+ | ○ | ○ |
| Example 45 | △ | △ | ⊚+ | ○ | ○ |
| Example 46 | △ | △ | ⊚+ | ○ | ○ |
| Example 47 | ⊚ | ⊚ | ⊚+ | ○ | ○ |
| Example 48 | ⊚ | ⊚ | ⊚+ | ○ | ○ |
| Example 49 | ⊚ | ⊚ | ⊚+ | ○ | ○△ |
| Example 50 | ⊚ | ⊚ | ⊚+ | ○ | ○△ |
| Example 51 | ⊚ | ⊚ | ⊚+ | ○ | △ |
| Example 52 | ⊚ | ⊚ | ⊚+ | ○ | △ |
| Example 53 | ⊚ | ⊚ | ⊚+ | ○△ | ○ |
| Example 54 | ⊚ | ⊚ | ⊚+ | ○ | ○ |
| Example 55 | ⊚ | ⊚ | ⊚+ | ○ | ○ |
| Example 56 | ⊚ | ⊚ | ⊚+ | ○△ | ○ |
| Example 57 | ⊚ | ⊚ | ⊚+ | ○ | ○ |
| Example 58 | ⊚ | ⊚ | ⊚+ | ○ | ○ |
| Example 59 | ⊚ | ⊚ | ⊚ | ○ | ○ |
| Example 60 | ⊚ | ⊚ | ⊚ | ⊚ | ○ |
| Example 61 | ⊚ | ⊚ | ⊚ | ⊚ | ○ |
| Example 62 | ⊚ | ⊚ | ⊚ | ⊚ | ○ |
| Example 63 | ⊚ | ⊚ | ⊚ | ⊚ | ○ |
| Example 64 | ⊚ | ⊚ | ⊚ | ⊚ | ○ |
| Comparative Example 1 | X | ○ | X | ○ | ○ |
| Comparative Example 2 | X | ○ | X | X | ○ |
| Comparative Example 3 | ○ | X | ○ | ○ | ○ |
| Comparative Example 4 | X | X | X | X | ○ |
| Comparative Example 5 | X | ○ | X | X | ○ |
| Comparative Example 6 | ○ | X | ○ | X | ○ |
| Comparative Example 7 | ○ | ○ | X | ○ | ○ |
| Comparative Example 8 | ○ | X | ○ | X | ○ |
| Comparative Example 9 | ○ | X | ○ | X | ○ |
| Comparative Example 10 | X | ○ | X | ○ | ○ |
| Comparative Example 11 | X | ○ | X | ○ | ○ |

As shown in Table 8, it is found that the metal material treated with the surface treatment agent for metal material as specified in the present invention has excellent heat resistance in high-temperature environments and excellent adhesion and water resistance for a long period of time.

The invention claimed is:

1. A surface treatment agent for metal material comprising:
   a compound (A) obtained by modifying a silicic acid (a) with a hydrolysate (b) of an epoxy group-having silane coupling agent;
   a silicic acid (B) represented by $M_2O \cdot SiO_2$; and
   water,
   wherein a mass ratio (B/A) of the silicic acid (B) to the compound (A) is within a range of 1.1 to 17.9, and
   wherein a mass ratio ($M_2O/SiO_2$) of $M_2O$ to $SiO_2$ in the silicic acid (B) is within a range of 0.1 to 1 and M represents an alkali metal.

2. The surface treatment agent for metal material according to claim 1, wherein the hydrolysate (b) of the epoxy group-having silane coupling agent is obtained by ring-opening the epoxy group-having silane coupling agent with a carboxylic acid, and the surface treatment agent for metal material contains the carboxylic acid.

3. The surface treatment agent for metal material according to claim 1, wherein a mass ratio (a/b) of the silicic acid (a) to the hydrolysate (b) of the epoxy group-having silane coupling agent is within a range of 0.07 to 6.36.

4. The surface treatment agent for metal material according to claim 1, wherein the agent is for a metal material that is used for an electronic component and a micro device component.

5. A method of producing a surface treatment agent for metal material according to claim 1, comprising:
   adding a silicic acid (a), an epoxy group-having silane coupling agent, an acid catalyst (C) to water and mixing them to form an aqueous dispersion containing a compound (A) obtained by modifying the silicic acid (a) with a hydrolysate (b) of the epoxy group-having silane coupling agent; and
   adding the aqueous dispersion and a silicic acid (B) represented by $M_2O.SiO_2$ to water and mixing them,
   wherein a mass ratio (B/A) of the silicic acid (B) to the compound (A) is within a range of 1.1 to 17.9, and
   wherein a mass ratio ($M_2O/SiO_2$) of $M_2O$ to $SiO_2$ in the silicic acid (B) is within a range of 0.1 to 1 and M represents an alkali metal.

6. The method of producing a surface treatment agent for metal material according to claim 5, wherein the hydrolysate (b) of the epoxy group-having silane coupling agent is obtained by ring-opening the epoxy group-having silane coupling agent with a carboxylic acid, and the surface treatment agent for metal material contains the carboxylic acid.

7. The method of producing a surface treatment agent for metal material according to claim 5, wherein the mass ratio (a/b) of the silicic acid (a) to the hydrolysate (b) of the epoxy group-having silane coupling agent is within a range of 0.07 to 6.36.

8. The method of producing a surface treatment agent for metal material according to claim 5, wherein the agent is for a metal material that is used for an electronic component and a micro device component.

9. A metal material having a surface treatment coating, the coating obtained by bringing the surface treatment agent for metal material according to claim 1 into contact with a metal material.

10. A method of producing a metal material having a surface treatment coating comprising bringing the surface treatment agent for metal material according to claim 1 into contact with a metal material.

11. The surface treatment agent for metal material according to claim 2, wherein a mass ratio (a/b) of the silicic acid (a) to the hydrolysate (b) of the epoxy group-having silane coupling agent is within a range of 0.07 to 6.36.

12. The surface treatment agent for metal material according to claim 2, wherein the agent is for a metal material that is used for an electronic component and a micro device component.

13. The surface treatment agent for metal material according to claim 3, wherein the agent is for a metal material that is used for an electronic component and a micro device component.

14. The surface treatment agent for metal material according to claim 11, wherein the agent is for a metal material that is used for an electronic component and a micro device component.

15. The method of producing a surface treatment agent for metal material according to claim 6, wherein the mass ratio (a/b) of the silicic acid (a) to the hydrolysate (b) of the epoxy group-having silane coupling agent is within a range of 0.07 to 6.36.

16. The method of producing a surface treatment agent for metal material according to claim 6, wherein the agent is for a metal material that is used for an electronic component and a micro device component.

17. The method of producing a surface treatment agent for metal material according to claim 7, wherein the agent is for a metal material that is used for an electronic component and a micro device component.

18. The method of producing a surface treatment agent for metal material according to claim 15, wherein the agent is for a metal material that is used for an electronic component and a micro device component.

19. The surface treatment agent for metal material according to claim 1, wherein the mass ratio (B/A) of the silicic acid (B) to the compound (A) is within a range of 1.1 to 8.9.

20. The surface treatment agent for metal material according to claim 1, wherein the surface treatment agent is a dried coating layer provided on the metal material.

* * * * *